(12) United States Patent
Cho

(10) Patent No.: US 11,639,758 B2
(45) Date of Patent: May 2, 2023

(54) AIR-VALVE UNIT FOR VACUUM SYSTEM

(71) Applicant: VTEC CO., LTD., Busan (KR)

(72) Inventor: Ho-Young Cho, Seoul (KR)

(73) Assignee: VTEC CO., LTD., Busan (KR)

( * ) Notice: Subject to any disclaimer, the term of this patent is extended or adjusted under 35 U.S.C. 154(b) by 103 days.

(21) Appl. No.: 17/310,012

(22) PCT Filed: Apr. 14, 2021

(86) PCT No.: PCT/KR2021/004695
§ 371 (c)(1),
(2) Date: Jul. 9, 2021

(87) PCT Pub. No.: WO2021/256683
PCT Pub. Date: Dec. 23, 2021

(65) Prior Publication Data
US 2022/0213980 A1    Jul. 7, 2022

(30) Foreign Application Priority Data

Jun. 19, 2020   (KR) .......................... 10-2020-0074986

(51) Int. Cl.
*F16K 51/02*        (2006.01)
*F16K 11/22*        (2006.01)
(Continued)

(52) U.S. Cl.
CPC .............. *F16K 51/02* (2013.01); *F16K 11/22* (2013.01); *F16K 11/24* (2013.01);
(Continued)

(58) Field of Classification Search
CPC .......... F16K 51/02; F16K 11/22; F16K 11/24; F16K 31/1223; F16K 31/122; F16K 31/42; F16K 31/12; F16K 37/005; F16K 37/0025; F16K 37/0091; G01L 19/086; F04F 5/20; F04F 5/52
See application file for complete search history.

(56) References Cited

U.S. PATENT DOCUMENTS 4,655,692 A * 4/1987 Ise ............................ F04F 5/48
                                                    417/187
4,915,015 A    4/1990 Richeson et al.
(Continued)

FOREIGN PATENT DOCUMENTS

DE         4001937 A1 *  7/1991
DE       10009167 A1 *  9/2001 ........... B25B 11/005
(Continued)

*Primary Examiner* — David Colon-Morales
(74) *Attorney, Agent, or Firm* — Innovation Capital Law Group, LLP; Vic Lin

(57) ABSTRACT

The present invention relates to an air-valve unit for a vacuum system. The valve unit may include a control part, which detects a pressure of an external exhaust space to output an on/off signal, to actively control supply/blocking of air into/from an exhaust hole. Also, the valve unit is preferably constituted by a plurality of holes and electronic valves so that an opening/closing of an outlet of each of the holes is controlled by the control part, and thus, extension of a vacuum generation line or combination of generation/destruction lines may be implemented.

9 Claims, 8 Drawing Sheets

(51) Int. Cl.
  *F16K 31/122* (2006.01)
  *F16K 11/24* (2006.01)
  *F16K 31/42* (2006.01)
  *G01L 19/08* (2006.01)

(52) U.S. Cl.
  CPC .......... *F16K 31/1223* (2013.01); *F16K 31/42* (2013.01); *G01L 19/086* (2013.01)

(56) References Cited

U.S. PATENT DOCUMENTS

| | | | |
|---|---|---|---|
| 4,930,464 A | 6/1990 | Letsche | |
| 4,961,413 A | 10/1990 | Grey et al. | |
| 5,193,495 A | 3/1993 | Wood, III | |
| 5,282,490 A | 2/1994 | Higgs | |
| 5,316,261 A | 5/1994 | Stoner | |
| 5,320,497 A * | 6/1994 | Nagai | B65G 47/91 417/189 |
| 5,566,718 A * | 10/1996 | Nagai | F15B 13/0832 294/185 |
| 5,603,305 A | 2/1997 | Miyake et al. | |
| 5,617,898 A * | 4/1997 | Nagai | F15B 13/0864 137/884 |
| 5,713,315 A | 2/1998 | Jyoutaki et al. | |
| 6,230,734 B1 | 5/2001 | Grebnev et al. | |
| 6,412,750 B1 | 7/2002 | Jun et al. | |
| 6,416,295 B1 * | 7/2002 | Nagai | F04F 5/52 417/187 |
| 6,536,738 B2 | 3/2003 | Inoue et al. | |
| 6,729,851 B2 * | 5/2004 | Cho | F04F 5/466 417/151 |
| 6,779,985 B2 * | 8/2004 | Cho | F04F 5/467 417/186 |
| 8,188,608 B2 * | 5/2012 | Tell | F04F 5/52 290/43 |
| 9,086,079 B2 * | 7/2015 | Cho | F16K 51/02 |
| 11,428,342 B2 * | 8/2022 | Nakayama | F04F 5/20 |
| 2005/0118032 A1 * | 6/2005 | Nagai | F04F 5/52 417/183 |
| 2006/0278282 A1 * | 12/2006 | Nagai | F04F 5/20 264/234 |

FOREIGN PATENT DOCUMENTS

| | | | | |
|---|---|---|---|---|
| EP | E P-2080913 A1 * | 7/2009 | | F04F 5/52 |
| KR | 930000837 A | 1/1993 | | |
| KR | 100205513 B1 | 7/1999 | | |
| KR | 200274371 Y1 | 5/2002 | | |
| KR | 200310713 Y1 | 4/2003 | | |
| KR | 100730323 B1 | 6/2007 | | |
| KR | 101035101 B1 | 5/2011 | | |
| KR | 101303749 B1 | 10/2013 | | |
| KR | 101630577 B1 * | 6/2016 | | |
| KR | 20190085086 A | 7/2019 | | |
| WO | WO-2006039959 A1 * | 4/2006 | | F04F 5/52 |

* cited by examiner

[FIG. 4]
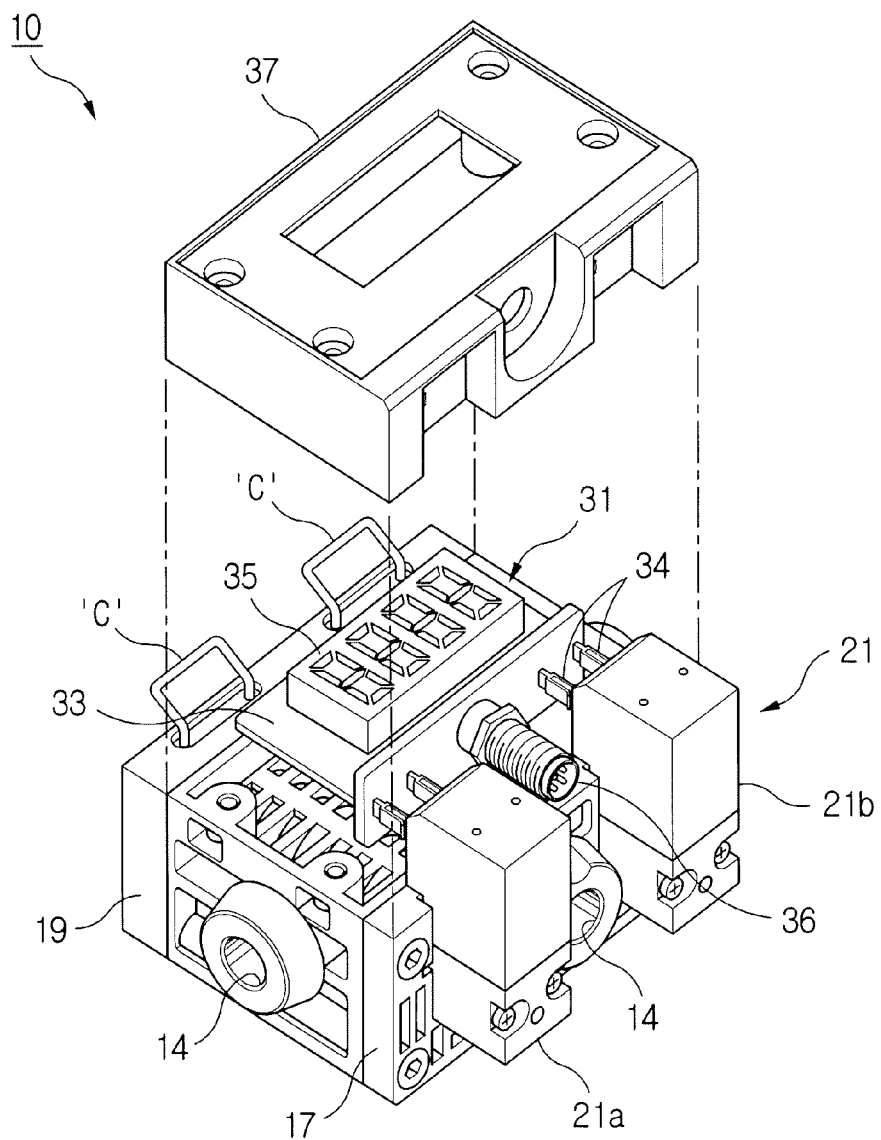

[FIG. 5]
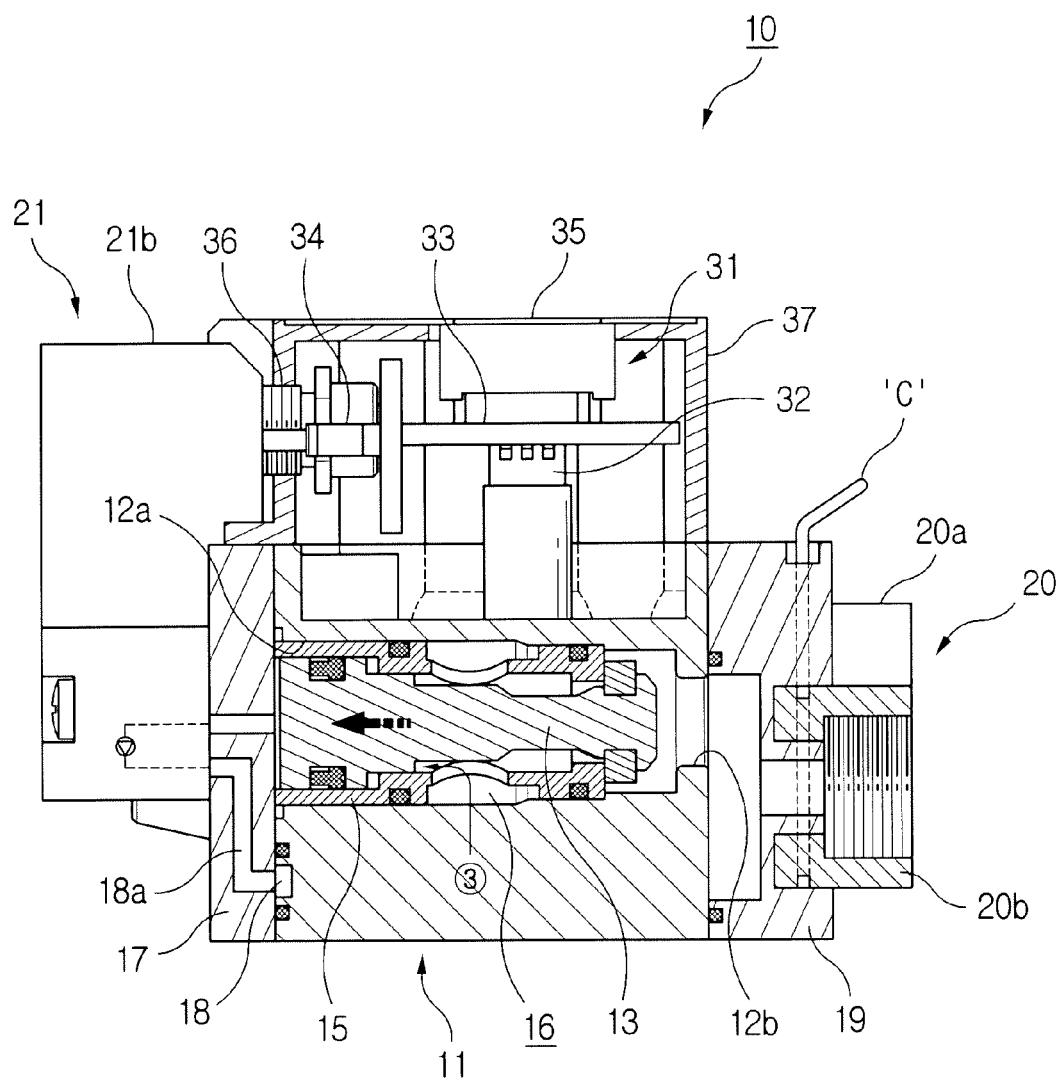

[FIG. 6]
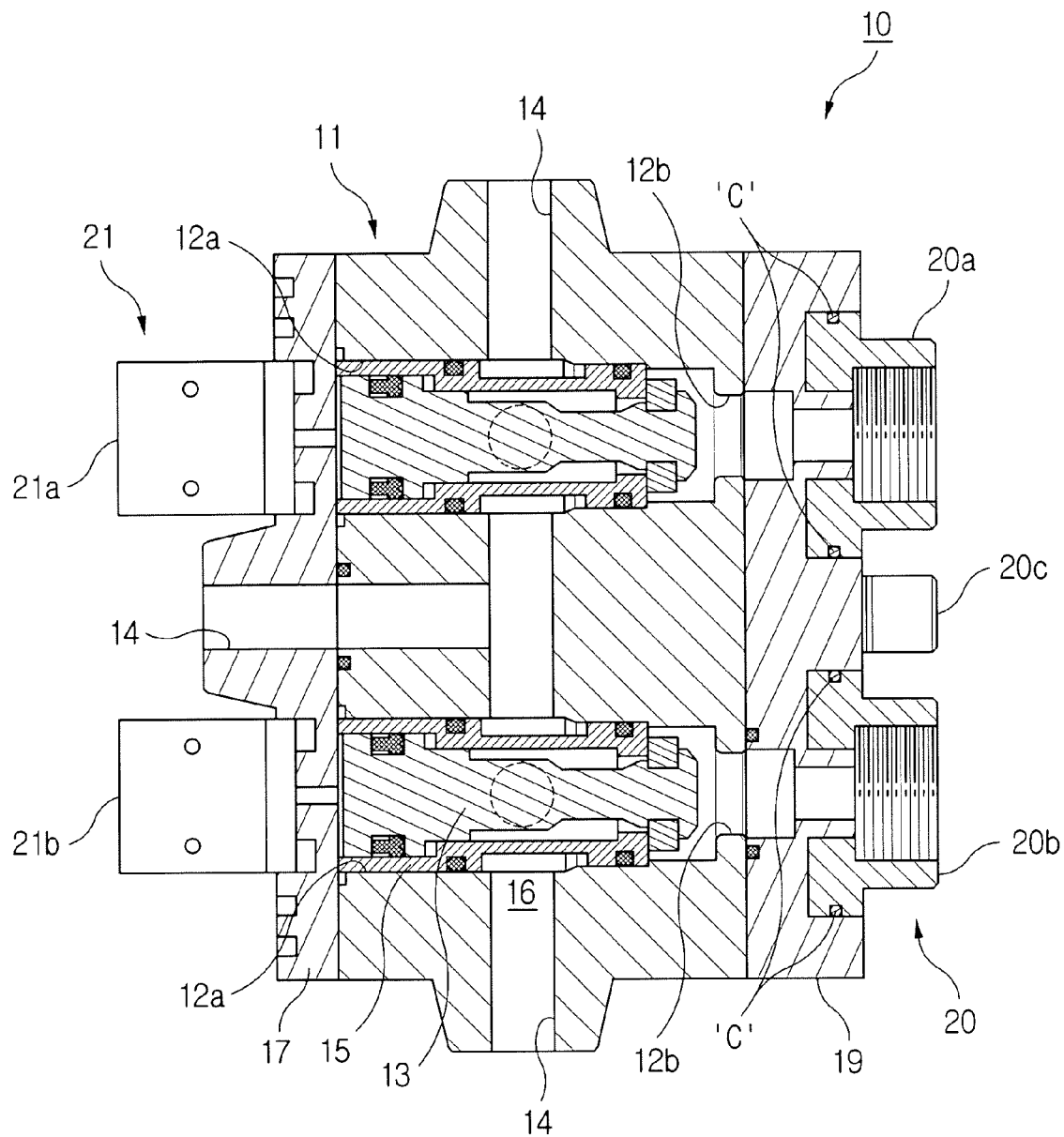

[FIG. 7]
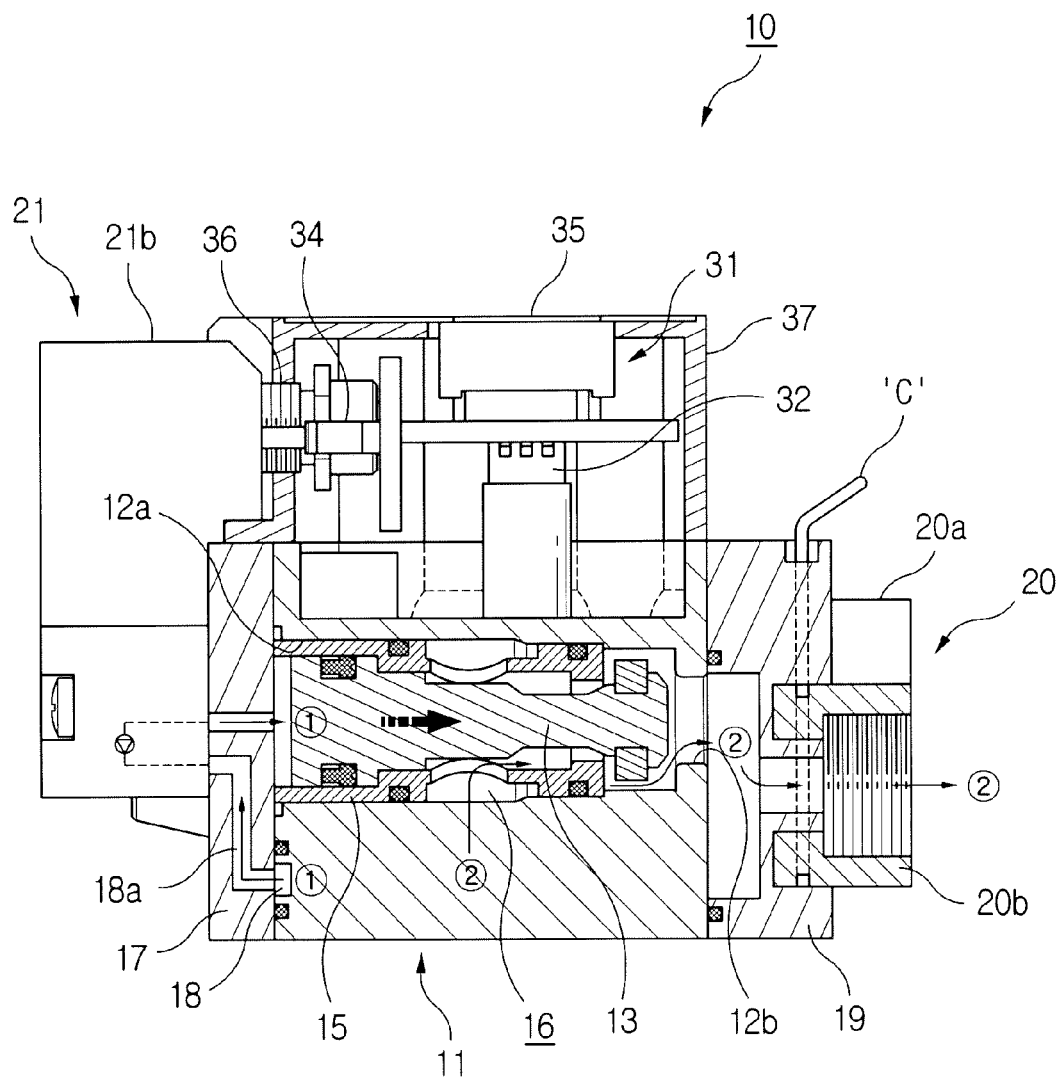

【FIG. 8】
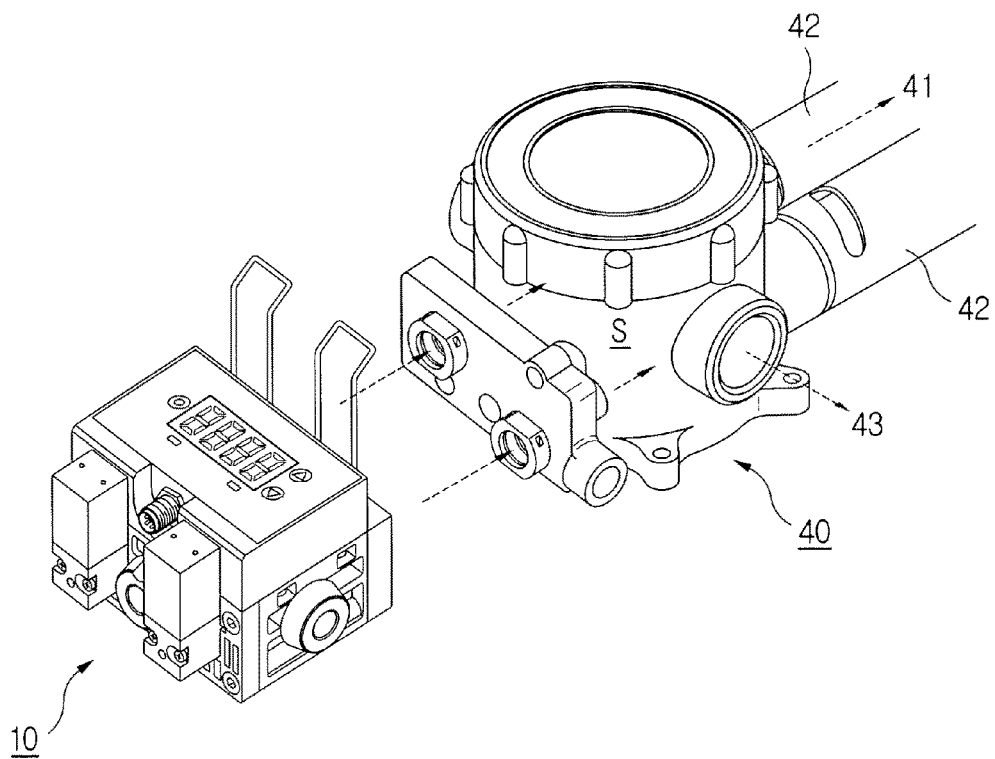
【FIG. 9】
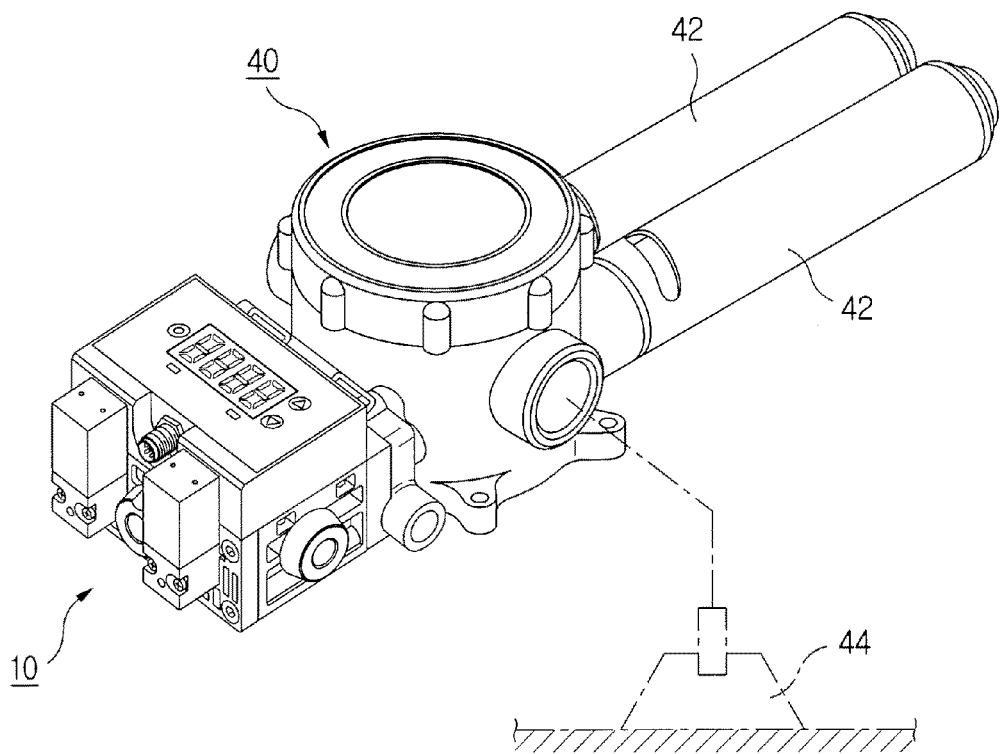

AIR-VALVE UNIT FOR VACUUM SYSTEM

TECHNICAL FIELD

The present invention relates to an air-valve unit, and more particularly, to a valve unit used to control supply of compressed air in a vacuum transfer system.

BACKGROUND ART

In general, a vacuum transfer system includes a vacuum pump that operates by a compressed air supplied and discharged at a high speed and high pressure and a vacuum gripper that is exhausted by an operation of the vacuum pump and is configured so that an object is gripped using vacuum and a negative pressure, which are generated in the vacuum pump and the gripper and then is transferred to a predetermined position by a (robotic) means.

Naturally, the compressed air is properly supplied and blocked, and the present invention relates to an air control valve provided for the control.

The typical air-control valve used in the system is configured to open/close an outlet and supply/block air by a spool that is reciprocated according to an on/off of an electronic valve that drives the valve. An air-control valve having such a structure is disclosed in Korean Utility Model No. 0274371, Korean Patent No. 1035101, and Korean Patent No. 1303749.

Referring to FIG. 1, in the structure of the air-control valve (100), a portion of compressed air supplied to a hole inlet (102) of a casing (101) presses and moves a spool (104) within the air hole (103). For example, the spool (104) is moved backward in a state in which the electronic valve is turned on to open an outlet (106), and on the other hand, the spool (104) is moved forward in a state in which the electronic valve is turned off to close the outlet (106).

For reference, when the outlet (106) is opened, the compressed air supplied to a passage (103) from the inlet (102) passes through the outlet (106) of the air-control valve (100) and then passes through a vacuum pump (not shown) so as to be discharged. In this process, air within a gripper connected to a suction port of the vacuum pump is suctioned and then discharged together with the compressed air to generate the vacuum and the negative pressure for the gripping of the object.

It is true that the air-control valve (100) configured as described above is actually usefully used in a general vacuum transfer system. However, there are two main problems as follows.

First, there is no means or method capable of controlling the electronic valve (105). That is, although the control valve (100) opens/closes the air passage (103) by the operation of the electronic valve (105), it does not have a means for actually controlling the operation. For example, a separate means may be manufactured and connected to the control valve (100), but in this case, a configuration and design of the system are inevitably complicated.

Second, only one air line is provided. In order to effectively grip and repeatedly transfer the object to be transferred, it is necessary to extend a vacuum generation line or to be used in combination with generation/destruction lines, but the control valve (100) may not respond to these needs. For example, although it is possible to respond to the needs by connecting a plurality of the control valves (100) in parallel, the configuration, design, and assembly of the system are inevitably complicated in this case as well.

As a result, these problems are disadvantageous in various aspects such as operation precision, speed, efficiency, and economic feasibility of the vacuum transfer system.

The below are considered prior art documents:
Korean Utility Model No. 0274371,
Korean Utility Model No. 0310713,
Korean Patent No. 0730323,
Korean Patent No. 1035101 and
Korean Patent No. 1303749.

DISCLOSURE OF THE INVENTION

Technical Problem

The present invention has been proposed to solve the problems according to the related art. An object of the present invention is to provide an air-valve unit that is capable of detecting a level of a vacuum pressure in an external exhaust space to autonomously actively controlling an electronic valve in a vacuum system. Another object of the present invention is to provide an air-valve unit for a vacuum system, in which a plurality of air lines are organically connected to each other to implement expansion or diversity of use in a single module.

Technical Solution

A valve unit according to the present invention includes:
a body comprising a through-hole, a spool that opens and closes an outlet of the hole while moving in an axial direction within the hole, and a first passage and a second passage, which extend from an air supply hole formed at one side toward the outlet of the spool;
an electronic valve installed in the second passage to control supplying and blocking of air for movement of the spool; and
a control part including a pressure detection sensor connected to an external exhaust space and a circuit part that processes pressure data of the sensor, the control part outputting an on/off signal of the electronic valve based on the data,
wherein
the air supply hole is formed in plurality in an outer surface of the body in directions different from each other to communicate with each other.

The on/off signal of the electronic valve may be generated in the control part or an external device.

Naturally, the electronic valve may be opened or closed by the signal output of the control part. When being opened, air passing through the second passage may move the spool, and, for example, when the outlet is opened by the movement, the air may be discharged through the first passage and the outlet.

Here, the air discharged through the outlet may be suctioned into and exhausted from the exhaust space to form vacuum while passing through an ejector of a separately provided vacuum pump at a high speed.

Preferably, the hole may be provided in plurality to communicate with each other, and the plurality of electronic valves respectively corresponding to the holes may be collectively or individually controlled by the control part.

In this case, it is preferable that:
it is designed so that at least one hole is connected to the vacuum generation line extending to the ejector, and at least the other hole is connected to the destruction line extending into the exhaust space, and the lines sequentially operate under the control of each of the electronic valve of the control part.

Advantageous Effects

The valve unit according to the present invention may include the control part that detects and processes the level of the pressure in the external exhaust space to control the electronic valve according to the level of the pressure level or the degree of the vacuum to actively control the electronic valve and the supply/blocking of the air by itself without the additional means. In the preferred example, the plurality of air lines may be organically connected to each other in the valve unit single module, for example, the extension of the vacuum generation line or the combination of the generation/destruction lines may be implemented to easily respond to the needs of the expansion and diversity of use through the simple structure.

BRIEF DESCRIPTION OF THE DRAWINGS

FIG. 4 is a view illustrating an assembly state of FIG. 2.

FIG. 5 is a cross-sectional view taken along line 'A-A' of FIG. 2.

FIG. 6 is a cross-sectional view taken along line 'B-B' of FIG. 2.

FIG. 7 is a view illustrating an operation of a valve unit according to the present invention.

FIG. 8 is a view illustrating an arrangement of the valve unit and a vacuum pump according to the present invention.

FIG. 9 is a view illustrating a coupling state of FIG. 8.

The below provides a description of the symbols:

10. Valve unit,
11. Body, 12. Hole,
12a. Inlet, 12b. Outlet,
13. Spool, 14. Air supply hole,
15. Spool housing,
16. First passage, 17. Cover,
18. Second passage, 18a. Extension line,
19. Cover, 20, 20a, 20b, 20c. Adapter, 21, 21a, 21b. Electronic valve,
31. Control part, 32. Sensor,
33. Circuit part, 34. Terminal,
35. Display part, 36. Connector,
40. Vacuum pump, 41. Generation line,
42. Ejector, 43. Destruction line,
44. Gripper,
C. Clip and
S. Exhaust space.

MODE FOR CARRYING OUT THE INVENTION

Figure 1:
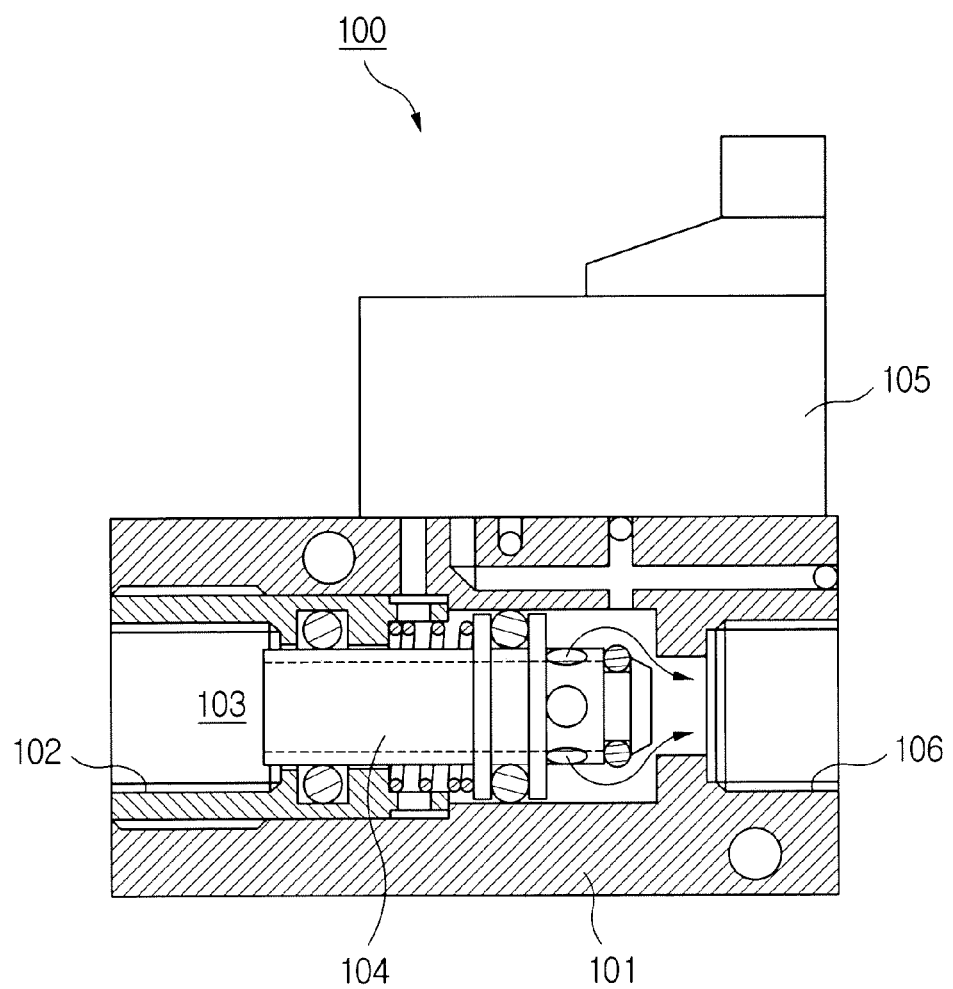
FIG. 1 is a cross-sectional view illustrating a configuration of an air control valve according to a related art.
Figure 2:
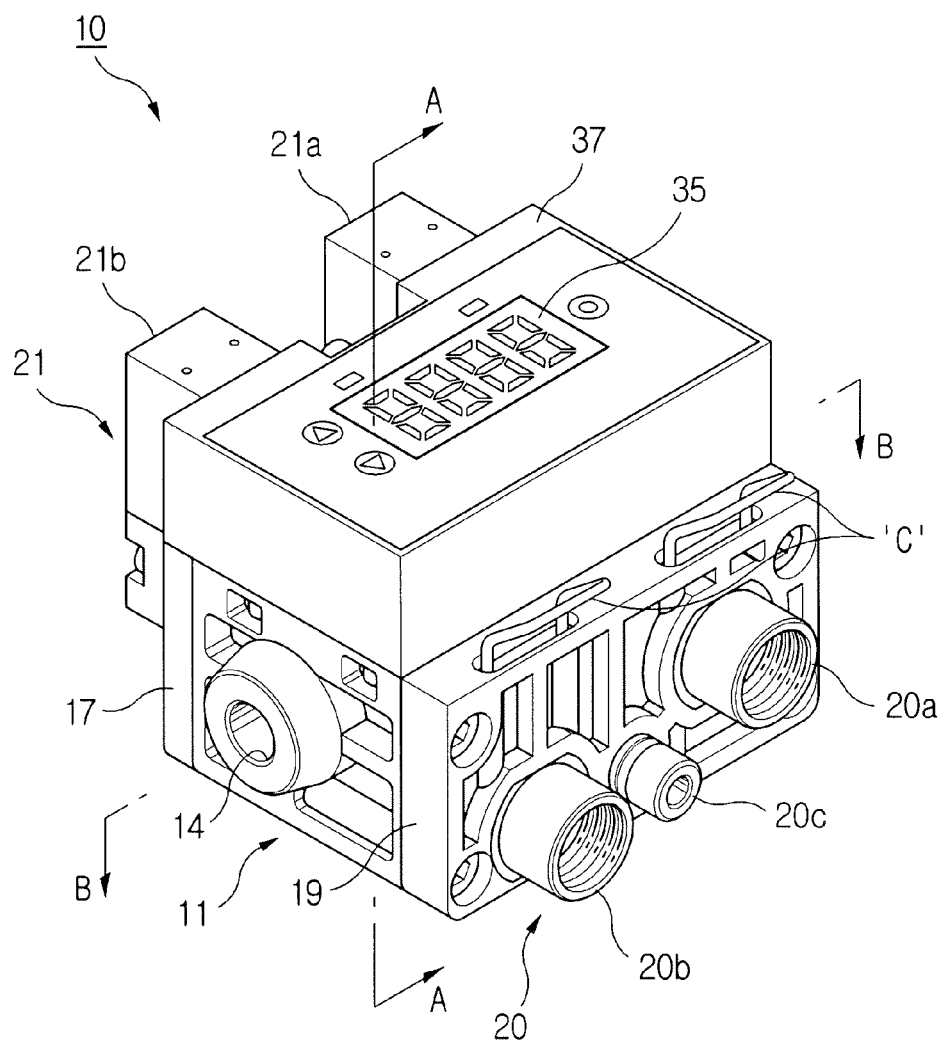
FIG. 2 is a view illustrating an outer appearance of a valve unit according to the present invention.
Figure 3:
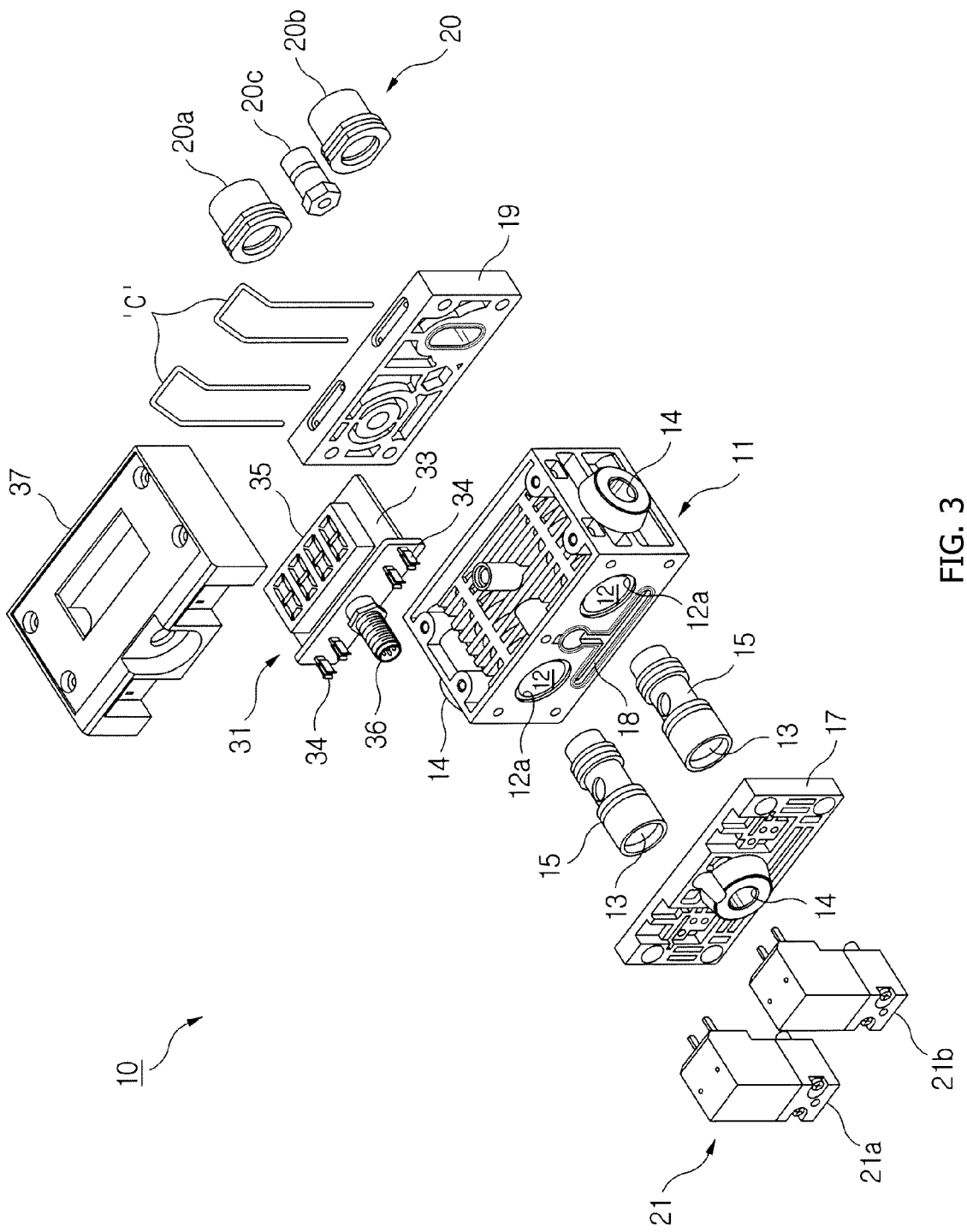
FIG. 3 is an exploded view of FIG. 2.

The technical features and effects of an 'air-valve unit for a vacuum system' (hereinafter, referred to as a 'valve unit'), which is described above or not described above, according to the present invention will be more apparent through the description of embodiments described below with reference to the accompanying drawings. In FIG. 2, the 'valve unit' according to the present invention is denoted by reference numeral 10.

Referring to FIGS. 2 to 6, a valve unit (10) according to the present invention includes a block-type body (11), an electronic valve (21) provided at one side of the body (11), and a control part 31 provided at the other side of the body (11) to control an overall operation of the valve unit (10) including the body and the electronic valve (21).

Particularly, the body (11) includes a through-hole (12) in a transverse direction, a spool (13) that opens and closes an outlet (12b) of the hole (12) while moving in an axial direction within the hole (12), and a first passage (16) and a second passage (18), which extend from an air supply hole (14) formed at one side toward the outlet (12b) of the spool (13). For reference, the inlet (12a) of the hole (12) is always closed by one end of the spool (13).

Reference numeral '15' denotes a spool housing integrally fixed to an inner wall of the hole (12).

Preferably, the air supply hole (14) is formed in plurality in an outer surface of the body (11) in directions different from each other and is configured to communicate with each other inside the body (11). This allows air to be supplied at various positions, postures, and angles, thereby solving a spatial limitation in use of the air valve (10) according to the present invention. Also, for convenience of installing the spool (13) and the electronic valve (21) or designing the second passage (18), the body (11) may further include a cover (17) having a predetermined thickness.

In the drawing, reference numeral (18a) indicated on the cover (17) is an extension line extending from the second passage (18) to connect the electronic valve (21).

The electronic valve (21) is a mean that is disposed at a side of the inlet (12a) of the hole (12) of the body (11) and is installed in the second passage (18) at a side of the spool (13) to control supplying and blocking of air for movement of the spool (13). In the drawing, the electronic valve (21) includes two electronic valves (21a and 21b) corresponding to the number of holes (12), but the present invention is limited to the number of electronic valves (21) and the number of holes (12).

Here, the electronic valve (21) is a solenoid valve that is normally used for opening and closing the passage and is assumed to be 'opened' when the valve is turned on.

The control part 31 includes a pressure detection sensor (32) connected to an external exhaust space (see reference symbol 'S' in FIGS. 8 and 9), a circuit part (33) that processes pressure data of the sensor (32), and a connection terminal (34) extending from the circuit part (33) and connected to the electronic valve (21). Also, an on/off signal of the electronic valve (21) is output based on the sensed pressure data. Preferably, the control part (31) further includes a display that numerically processes the pressure data obtained by the sensor (32) to display the resultant value to the outside, that is, a display part (35).

Reference numeral (37) denotes a cover in which an exposure window of the display part (35) is formed.

Preferably, in this case, an on/off signal of the electronic valve (21) is generated by the control part (31), but may be generated by an external device and transmitted to the control part (31) in some cases. Reference numeral (36) denotes a connector for data communication or power connection with the outside. Naturally, the electronic valve (21) is opened or closed by an output signal of the control part (31).

Referring to FIGS. 5 and 7, in this embodiment, the air supplied into the body (11) through the air supply hole (14), that is, compressed air is:

first stopped and stands by within the body (11) when being 'closed'; and when being 'opened', the compressed air passes through the second passage (18) to press and move the spool (13) (see an arrow ①), and when the outlet (12b) is opened by the movement of the spool (13), the compressed air is discharged through the first passage (16) and the outlet (12b) via the hole (12) (see an arrow ②); and then when being 'closed' again, the compressed air presses and move the spool (13) in an opposite direction within the first passage (16) (see an arrow ③), and when the outlet (12b) is closed by the movement, the compressed air is stopped/stands by within the body (11) like the beginning.

However, in another embodiment, it may be designed so that a spring supporting the spool (13) is provided inside the hole (12) to move the spool (13) by elasticity of the spring (in a direction of the arrow ③ direction) when being 'closed'.

Also, contrary to the above, it may be designed so that the movement of the spool (13) closes the outlet (12b) of the hole (12) when the spool (13) is 'opened'. This may be implemented simply, for example, by allowing a length of the spool (13) itself or its moving distance in the drawing to be slightly longer toward the outlet (12b). In this case, the compressed air may be discharged (in a direction of the arrow ②) through the first passage (16) when being 'closed'.

In any case, the air discharged to the first passage (16) and the hole outlet (12b) is used to suction and exhaust the external exhaust space (S) to form a negative pressure and vacuum. Preferably, the discharged air is suctioned into and exhausted from the exhaust space (S) to form the vacuum while passing through an ejector (42) of the separately provided vacuum pump (40) at a high speed.

Referring to FIGS. 8 and 9, the vacuum pump (40) is a general air pump and includes a cylindrical ejector (42), through which high-speed compressed air passes, and the exhaust space (S) or a vacuum chamber communicating with the ejector (42). In the vacuum transfer system, the exhaust space (S) and the gripper (44) are connected to each other, and the object is gripped using the vacuum and negative pressure, which are formed in the exhaust space (S) and the gripper (44). The vacuum pump (40) illustrated in the drawing is disclosed in Korean Patent No. 0730323.

For connection with the vacuum pump (40), the body (11) further includes a cover (19) having a predetermined thickness and a plurality of connection adapters (20). The adapter (20) may include connection adapters (20a and 20b) between the outlet (12b) and each of a vacuum generation line (41) and a destruction line (43) and a connection adopter (20c) between the sensor (32) and the exhaust space (S). Reference symbol 'C' denotes a clip installed to pass through the cover (19) so as to fix the adapters (20a and 20b).

As illustrated in the drawings, the hole (12) is provided in plurality in a communication relationship with each other, and the electronic valve (21) is also provided in plurality to correspond to each hole (12). Here, each of the electronic valves (21a and 21b) may be collectively or individually controlled by the control part (31).

Also, in this case:
it is designed so that
at least one hole (12) is connected to the vacuum generation line (41) extending to the inlet of the ejector (42) of the vacuum pump (40), and at least the other hole (42) is connected to the destruction line (43) that directly extends into the exhaust space (S), and the generation line (41) and the destruction line (43) sequentially operate under the control of each of the electronic valve (21a, 21b) of the control part (31).

Of course, a plurality or all of the holes (12) may be connected to the vacuum generation line (41) to allow the generation line (41) to extend. Even then, in the actual vacuum system, the 'generation' and 'destruction' of the vacuum for the exhaust space (S) are sequentially repeated so that an article is rapidly transferred.

Vacuum Generation

First, the control part (31) controls the electronic valve '21a' to be opened in a turn-on state until the sensing pressure (-kPa) reaches an initial set level. Thus, the compressed air supplied to the air supply hole (14) continuously passes through the vacuum generation line (41), and in this process, a desired level of the vacuum is generated in the exhaust space (S). The system grips the object using the vacuum at this time transfer the object to a predetermined place by using robotic means or the like.

The 'level' may be input and set before the system operates by manipulating the display part (35) or the control part (31) in consideration of characteristics of the object. Also, when the detected pressure reaches the level or when the object transfer of the system is completed, the electronic valve '21a' is closed in an off state.

Vacuum Destruction

Next, when the object transfer of the system is completed, the control part (31) opens the electronic valve '21b' in the turn-on state. In this state, the compressed air supplied to the air supply hole (14) is directly supplied to the exhaust space (S) through the vacuum destruction line (43), and thus, the generated vacuum is destructed instantaneously. Then, the gripper (44) and the object may be separated easily and quickly from each other, and the valve unit (10) and the vacuum pump (40) according to the present invention may be prepared for the next transfer operation of the system.

In this way, the valve unit (10) according to the present invention is coupled to the vacuum pump having the vacuum generation line and the destruction line, and the supply/blocking of the compressed air and the generation/destruction of the vacuum may be actively controlled to correspond to the level of the pressure of the exhaust space therein. Therefore, it is very effective when compared to the typical valve in aspects of precision, speed, efficiency, etc. of the operation of the vacuum transfer system.

In addition, as described above, it has been described that the two electronic valves (21a and 21b) and each corresponding hole (12) respectively control the two air lines (41 and 43) in one valve unit (10), but the valve unit (10) according to the present invention is not limited to the number and function, and also, as described above, the vacuum generation line (41) may be used to be expanded and changed in a manner such as the expansion and diversity.

The invention claimed is:
1. An air-valve unit for a vacuum system, the air-valve unit comprising:
a body comprising a through-hole (12), a spool (13) that opens and closes an outlet (12b) of the hole (12) while moving in an axial direction within the hole (12), and a first passage (16) and a second passage (18), which extend from an air supply hole (14) formed at one side toward the outlet (12b) of the spool (13);
an electronic valve (21) installed in the second passage (18) to control supplying and blocking of air for movement of the spool (13); and a control part (31) comprising a pressure detection sensor (32) connected to an external exhaust space (S) and a circuit part (33) that processes pressure data of the sensor (32), the control part (31) outputting an on/off signal of the electronic valve (21) based on the data, wherein the air supply hole (14) is formed in plurality in an outer surface of the body (11) in directions different from each other to communicate with each other.

2. The air-valve unit of claim 1, wherein the on/off signal of the electronic valve (21) is generated in the control part (31).

3. The air-valve unit of claim 1, wherein the electronic valve (21) is opened or closed by an on/off signal of an output of the control part (31);

when being 'opened', air passing through the second passage (18) moves the spool (13); and when the outlet (12*b*) is opened by the movement of the spool (13), the air is discharged through the first passage (16) and the outlet (12*b*).

4. The air-valve unit of claim 1, wherein the control part (31) further comprises:

a connection terminal (34) connected from the circuit part (33) to the electronic valve (21); and a display part (35) that numerically processes the pressure data obtained by the sensor (32) to display a resultant value to an outside of the air-valve unit.

5. The air-valve unit of claim 3, wherein the air supplied into the body (11) through the air supply hole (14) is:

first stopped and stands by within the body (11) when being 'closed'; and when being 'opened', the air passes through the second passage (18) to press and move the spool (13), and when the outlet (12*b*) is opened by the movement of the spool (13), the air is discharged through the first passage (16) and the outlet (12*b*) via the hole (12); and then when being 'closed' again, the air presses and moves the spool (13) in an opposite direction within the first passage (16), and when the outlet (12*b*) is closed by the movement, the air is stopped/stands by within the body (11) like the beginning.

6. The air-valve unit of claim 1, wherein:

the hole (12) is provided in plurality to communicate with each other, the electronic valve (21) is provided in plurality, and the plurality of electronic valves (21), respectively corresponding to the holes (12), are collectively or individually controlled by the control part (31).

7. The air-valve unit of claim 3, wherein the air discharged through the outlet (12*b*) is suctioned into and exhausted from the exhaust space (S) to form vacuum while passing through an ejector (42) of a separately provided vacuum pump (40).

8. The air-valve unit of claim 7, wherein:

the hole (12) is provided in plurality to communicate with each other, the electronic valve (21) is provided in plurality, and the plurality of electronic valves (21), respectively corresponding to the holes (12), are collectively or individually controlled by the control part (31).

9. The air-valve unit of claim 8, wherein it is designed so that at least one hole (12) of the plurality of holes is connected to a vacuum generation line (41) extending to an ejector (42), and at least the ejector (42) is connected to a destruction line (43) extending into the exhaust space (S), and the lines (41, 43) sequentially operate under the control of each of the electronic valve (21*a*, 21*b*) of the control part (31).

\* \* \* \* \*